United States Patent [19]

Joy et al.

[11] Patent Number: 5,212,686

[45] Date of Patent: May 18, 1993

[54] ASYNCHRONOUS TIME DIVISION SWITCHING ARRANGEMENT AND A METHOD OF OPERATING SAME

[75] Inventors: Andrew K. Joy, Northampton; Michael D. Jager, Surrey; Andrew J. Pickering, Warwickshire; Raymond E. Oakley; John S. Arnold, both of Northants, all of England

[73] Assignees: Plessey Overseas Limited, Ilford; Gec Plessey Telecommunications Limited, Coventry, both of England

[21] Appl. No.: 414,289

[22] Filed: Sep. 29, 1989

[30] Foreign Application Priority Data

Oct. 6, 1988 [GB] United Kingdom ............... 8823493
Aug. 1, 1989 [GB] United Kingdom ............... 8917530

[51] Int. Cl.$^5$ .............................................. H04Q 11/04
[52] U.S. Cl. ......................................... 370/60; 370/94.1
[58] Field of Search ................ 370/60, 60.1, 94.1, 370/112, 58.1, 58.2, 58.3, 110.1; 341/100, 101

[56] References Cited

U.S. PATENT DOCUMENTS 3,914,553 10/1975 Melindo et al. ................. 341/100
3,979,733 9/1976 Fraser .............................. 370/60
4,816,823 3/1989 Polkinghorne et al. ......... 370/110.1
4,910,731 3/1990 Sakurai et al. ..................... 370/60

OTHER PUBLICATIONS

Andrew K. Joy, et al Asynchronous Time Division Switching Arrangement and a Method of Operating Same.
8823493.5, Oct. 6, 1988 and #8917530.1, Aug.1, 1989.

Primary Examiner—Douglas W. Olms
Assistant Examiner—Shick Hom
Attorney, Agent, or Firm—Jacobson, Price, Holman & Stern

[57] ABSTRACT

An asynchronous time division multiplex switching arrangement comprises a serial to parallel converter arranged to receive input packets of data which include routing information, in serial form and convert the packets of data to parallel form. A random access memory is provided in which each packet of data is entered at an addressed location into the memory, and the address is entered in a respective first-in first-out output queue at the tail. The address at the head of the queue is accessed and the packet of data is read from the random access memory into a parallel to serial converter and the packet of data is serially delivered to the associated output.

8 Claims, 6 Drawing Sheets

ASYNCHRONOUS TIME DIVISION SWITCHING ARRANGEMENT AND A METHOD OF OPERATING SAME

FIELD OF THE INVENTION

The present invention relates to asynchronous time division switching arrangement and a method of operating the same.

In the field of broadband telecommunications networks a requirement has arisen for a switching system that can switch bursty or deterministic digital data streams of differing data rates with many origins to many differing destinations.

DESCRIPTION OF THE PRIOR ART

A method of achieving this goal has been employed world wide in the use of asynchronous time division multiplexing, where data is transmitted in packets. These packets contain many bytes of data, for example 32, together with a header of typically 3 or 4 bytes containing a virtual circuit number unique to that connection on that line, as well as check bytes, etc. The need has arisen therefore, for a switch that can switch these packets of data for any input line to any output line and allocate a new virtual circuit number.

Several solutions have already been made to this problem but all require large amounts of a RAM, or extra hardware, which limits the maximum switch size that can be accommodated on an integrated circuit. The closest solution to this problem has been a switch developed by CNET. This switch does not use the self-routing approach and hence requires a large RAM for the translation of the virtual circuit number to be incorporated in each switch. The present invention only requires one translation at the input to the switch structure which may use one or a plurality of stages of switching, each stage using one or more switching arrangements as described in the invention, and where one or more 'routing digits' are added to the front of the packet which together define the path to be used through the switch structure and which are removed at the output from the switch structure. The CNET switch employs a paradiagonal conversion of the inputs to produce interleaved bytes of data for presentation to the data RAM. This requires a faster access RAM than in the present invention where the wide serial to parallel shift registers allow more time for the interleaving of the RAM accesses using time multiplexing. The CNET switch uses separate blocks of memory for each of the input queues, whereas a shared memory for the queues enables a reduction to be made in the RAM size, and the use of output rather than input queues eliminates the possibility of cells being blocked. In a switching arrangement more than one input may address the same output at the same time and hence the need for a queue at each output since a single output may only transmit one packet at a time. In a switching arrangement with an equal number of inputs and outputs (the most usual case in practice) if more than one input addresses the same output at the same time, thus increasing the length of the queue at the output, there must be other outputs which are not addressed at that time thus their queues must shorten. If a common memory is shared between all the output queues on the arrangement then the memory capacity is used more efficiently since memory capacity can be allocated to where it is most needed. The result is that, with a shared memory, a smaller total memory capacity is needed to achieve the same probability of loss of packets due to memory overflow. It can be shown that, with more than one output served, the required total memory capacity is approximately halved for the same probability of lost packets.

A second advantage to a shared memory is that if the arrangement is used to concentrate a number of inputs onto a smaller number of outputs using a standard arrangement equipped with a larger number of outputs, for example equal to the number of inputs, the memory which would have been allocated to unused outputs in the case of separate output queues becomes available, with shared memory, for use on the outputs which are used.

SUMMARY OF THE INVENTION

Accordingly, an aim of the present invention is to provide an asynchronous time division multiplex switching arrangement which provides for a common memory which is shared by all output queues, and which overcomes the above mentioned problem, and which can be implemented using silicon technology, for example integrated circuit technology, making efficient use of the chip area.

The optimum position for the queues is at the output ports of the arrangement, however an output queue may be simultaneously addressed by all the input ports of the arrangement thus the input bandwidth of the queue must be N times the input port rate, where N is the number of input ports. Since the access cycle time of memory is relatively long, the queue memory must use a very large word length in order to cyclically access all the input ports in the required time and this also implies serial to parallel converters at each input and parallel to serial converters at each output. The invention uses memory words which are a fraction 'k' of a packet long, where 'k' is an even number. Use of adjacent odd and even pairs of the 'k' segments permits swing buffering of the input and output ports, one segment being held static in the input serial to parallel converter whilst the following segment is being received and similarly, one segment being parallel loaded to the output parallel to serial converter whilst the previous segment is being transmitted. Typical values of 'k' are 2 or 4, the choice depending upon memory speed and the geometry of the device. In this way enough time is provided to allow all of the inputs to be entered into a common queue memory. The highly parallel internal operation of the device is embodied in the topology which allows a very efficient use of silicon area in an integrated device.

STATEMENT OF THE OBJECT OF THE INVENTION

According to the present invention there is provided an asynchronous time division multiplex switching arrangement comprising a serial to parallel converter arranged to receive input packets of data which include routing information, in serial form and convert the packets of data to parallel form, a random access memory is provided in which each packet of data is entered at an addressed location into the memory, and the address is entered in a respective first-in-first-out output queue at the tail, and the address at the head of the queue is accessed and the packet of data is read from the random access memory into a parallel to serial converter and the packet of data is serially delivered to a required output.

BRIEF DESCRIPTION OF THE DRAWINGS

An embodiment of the present invention will now be described with the reference to accompanying drawings wherein the value of 'k' is 2 and in which.

DESCRIPTION OF THE PREFERRED EMBODIMENT

Figure 1:
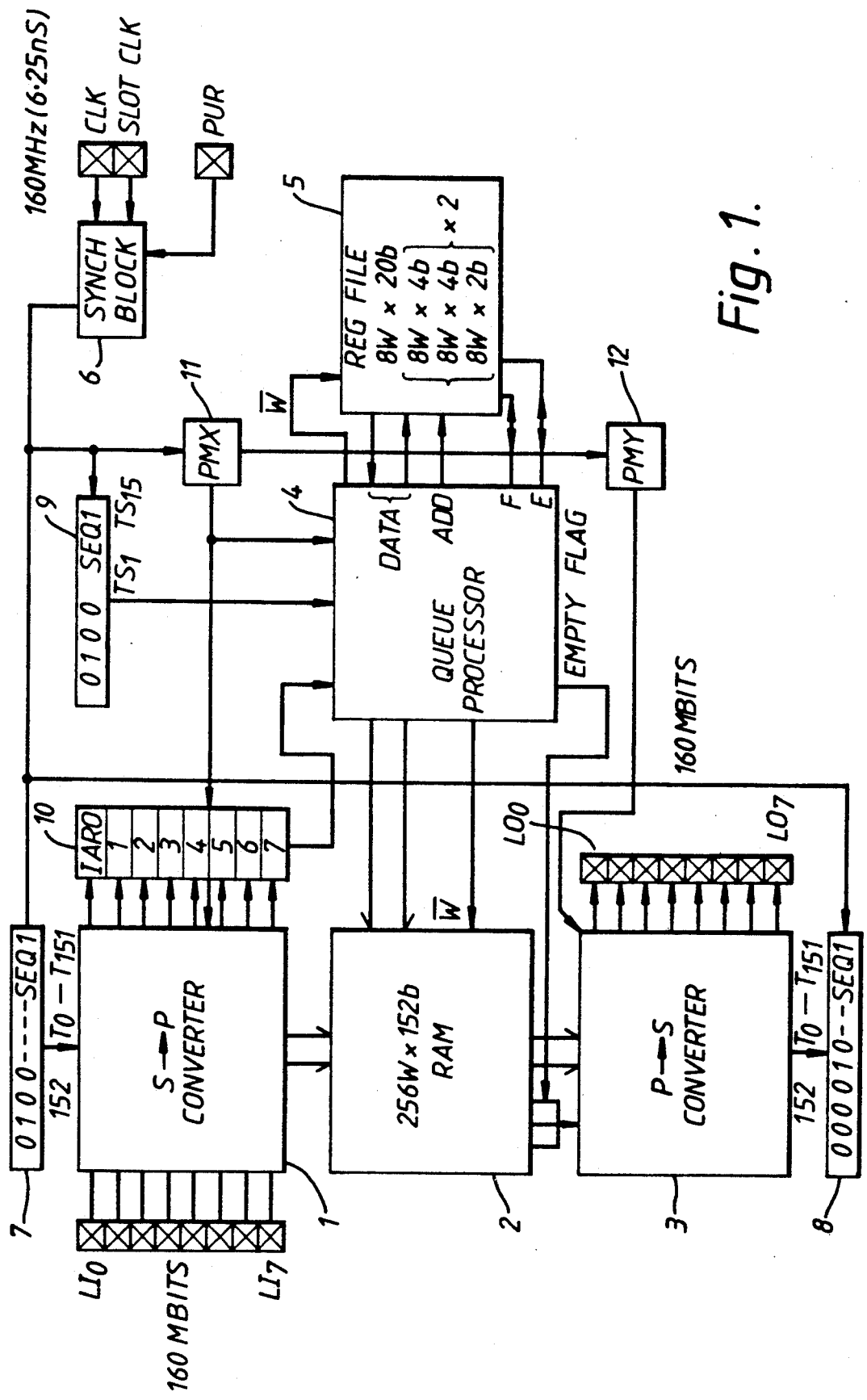
FIG. 1 shows a block diagram of one way of implementing the invention.

Referring to FIG. 1, a central core of an eight input, eight output asynchronous time division multiplex (ATD) switch is shown which operates at a data rate of approximately 160 Mbit/s, which for this simplified case, has a dedicated section of the memory allocated to each output queue. The system consists principally of an 8 input, 152 bit serial to parallel converter 1, a 38 kbit RAM 2 which implements the 16 packet FIFO queue associated with each output line, and an eight output parallel to serial converter 3. A queue processor 4 calculates a read and write address associated with each output queue while a register file 5 is employed to store the read and write address pointers, and the queue full/empty flags. A timing/synchronisation block 6 generates the timing signal required by the ATD logic. Signal PUR represents a reset signal when the arrangement is powered up. The serial to parallel converter 1 is shown receiving data input bits $T_0$ to $T_{151}$ at a rate of 160 Mbit/s from ports $LI_0$ to $LI_7$. The serial parallel converter 1 is controlled by a 'walking one' sequencer 7 and an address counter 11. Similarly the parallel to serial converter 3 is also controlled by a 'walking one' sequencer 8, and an address counter 12. The counters generates a 3 bit coded data signal for timing purposes. The data is shown leaving the parallel to serial converter 3 via output lines $LO_0$ to $LO_7$ at a data rate of 160 Mbit/s.

The 1st bit of the 1st half of a packet is reserved for a synchronisation bit. The 2nd and 3rd bits are used to indicate whether the current slot at the input is carrying a packet or is unused, the code 00 is used to indicate the unused state and will set a flag in the input address register 10 which will result in the subsequent attempt to write to an output queue being aborted. The bits immediately following the 3rd bit will carry routing digits, the portion of the packet allocated to the routing field is arbitrary provided that it does not overflow into the 2nd half of the packet. The position of the routing digit used by the device is in the bits immediately preceding the termination of the externally supplied Clock Slot pulse. The 1st half of the packet is fed to four bits of the input address register 10, these bits are connected as a shift register with a clock which is enabled by the presence of the Slot Clock pulse; thus these four register bits will hold the last four bits received prior to the termination of the Slot Clock pulse during receipt of the 2nd half of the packet.

The queue processor 4 is controlled by a 'walking one' sequencer 9 which in turn is controlled by the timing synchronisation block 6. The serial to parallel converter 1 also extracts input address register information which is fed to an input address register 10. The register 10 is controlled by a counter 11, and the address information is passed to the queue processor 4. The empty flag is used by the queue processor to abort write access to the RAM 2.

Figure 2:
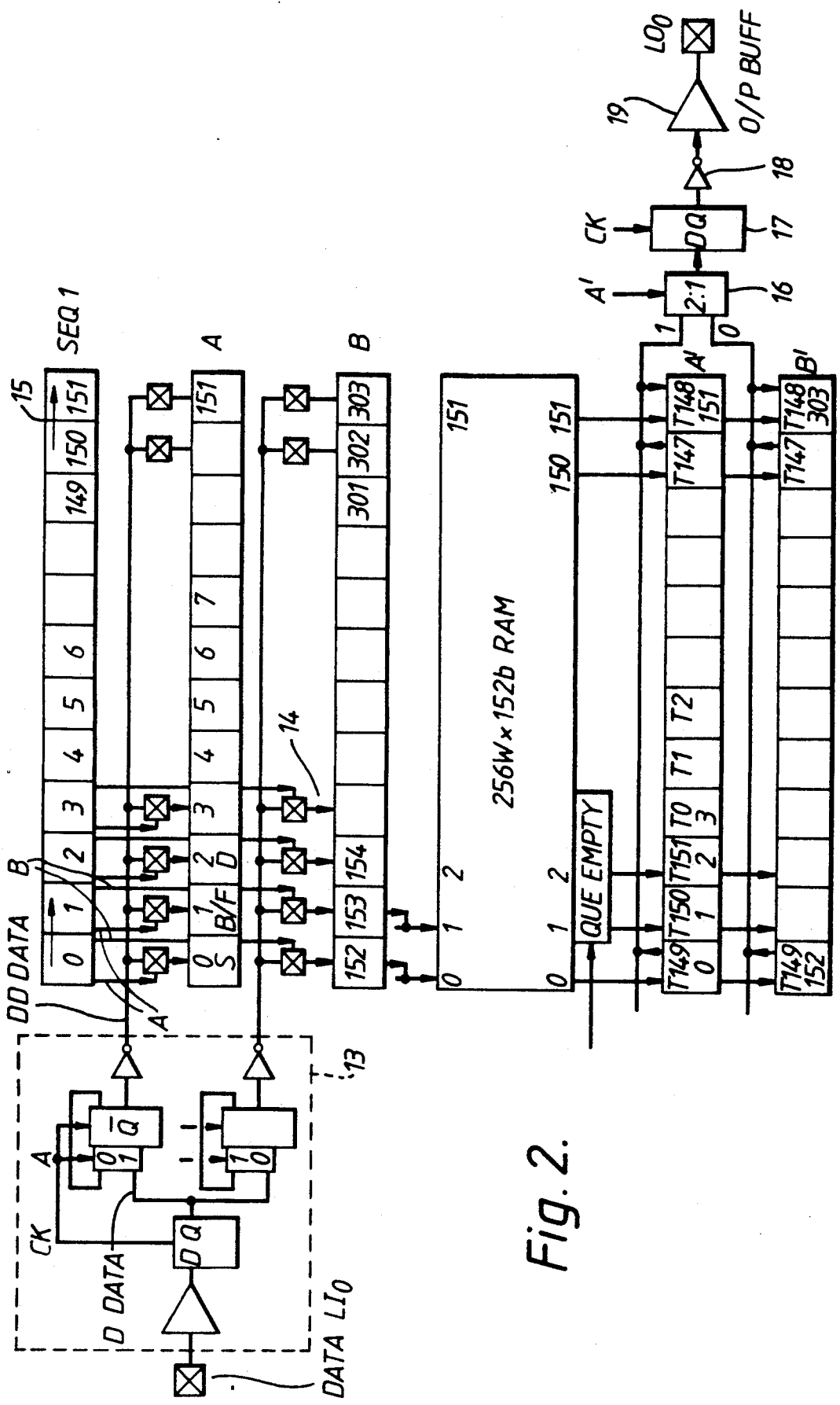
FIG. 2 shows input serial to parallel and output parallel to serial converters as used in FIG. 1.

For an ATD packet size of 304 bits, all inputs must be synchronised to 304 bit slots on the bearers and capable of being switched to any outgoing line number. If the particular output queue is full the incoming ATD cell routed to this queue is discarded. Under queue empty conditions the output D (diagnostic) and busy/free bits (B/F), as shown in FIG. 2, within the cell are set to zero while all other positions except for bit O, contain undefined data. Bit O, designated S is a synchronisation bit carrying a slot sync signal which acts as a local reference for timing purposes.

The selection of 304 bits for the packet length is made up as follows, 32 bytes of data, a 3 byte header and a 3 byte header internal to the switch structure which includes S, D and B/F bits and a 15 bit routing address.

Each input ATD cell of 304 bits of data must be stored in the addressed output FIFO queue. The switch has an internal cycle time of 100 ns, which is the time available for one memory read and one memory write operation. The input serial to parallel converter shown as 1 in FIG. 1 is shown in more detail in FIG. 2. Also the parallel to serial converter 3 is shown in more detail in FIG. 2. The serial to parallel converter shown in FIG. 2 consists of two 152 bit latches (A and B) at each input and a 152 bit 'walking one' sequencer 15 common to all inputs, the use of a 'walking one' sequencer together with latches reduces the power dissipation in a CMOS implementation by at least an order of magnitude over a shift register solution at high data rates.

During the first half period of an input ATD cell, data is stored in the A register, incoming bit 0 being stored in latch bit position 0, and incoming bit 151 being stored in latch bit position 151. The 'walking one' sequencer 15 cyclically selects each latch in turn to store incoming data thus only a few transistors are changing state, and hence consuming power, at each clock cycle. While the A register is being filled, the data in the B register is static and avaiable to be written into the RAM for the output specified by the identified routing digit. When the A register is full, the incoming data switches to the B register, and the B register is sequentially filled with the incoming second half of the ATD cell data. During this period the A register is static and available to be written into the RAM. Similarly the operation of the parallel to serial converter 3, in FIG. 1 and shown in FIG. 2 as register A' and register B', is similar to that as described in relation to registers A and B.

Each input such as $LI_0$ for example, is fed via a standard logic circuit 13, which directs the data to the appropriate half of the serial to parallel converter A, B. The data is gated into the respective bit position of the serial to parallel converter A, B by way of a respective gate 14 for example, which in turn is controlled by the 'walking one' sequencer 15.

The output from the respective parallel to serial converter A', B' is fed via a 2 to 1 multiplexer circuit 16 and fed out via a toggle 17 and inverter 18 to an output buffer 19. The output buffer 19 outputs the data on line $LO_0$.

Figure 3:
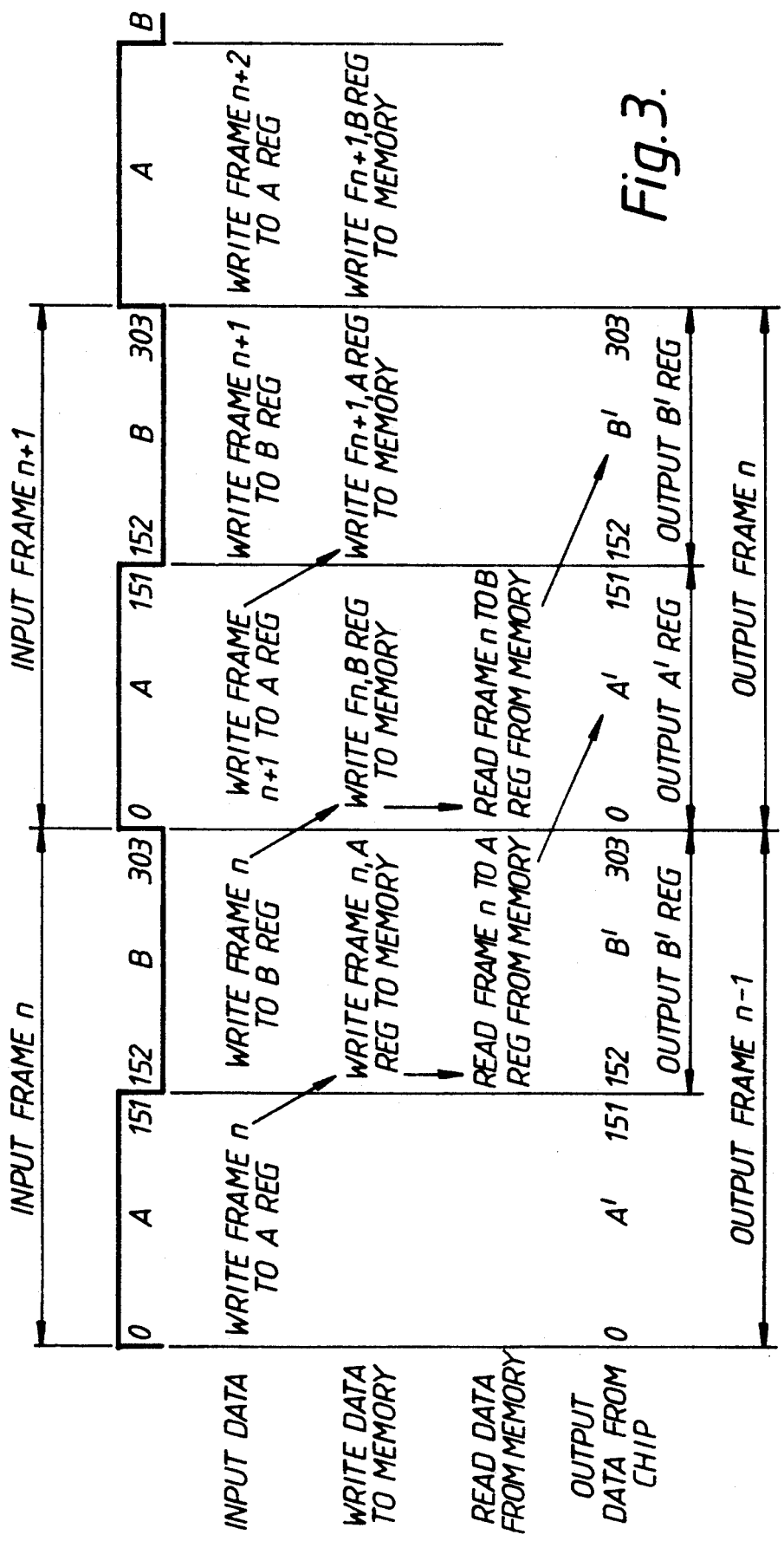
FIG. 3 shows a diagram of data flow.

FIG. 3 shows the data flow throughout the ATD switch. It can be seen that there is a minimum of 304 clock periods delay before an input data cell may appear at the output of the device, i.e. minimum latency of one ATD cell period. The output data is aligned to the input data so that the output of one ATD chip may feed the input of another in a matrix. The input slot clock negative edge is employed to extract the appropriate 3 bit address routing information associated with each of the five possible ranks of a switch matrix. However, alternative methods could be used to identify these routing bits, such as hard wiring of a binary code for the rank position of the switch, which can be decoded into the bit positions required.

Figure 4:
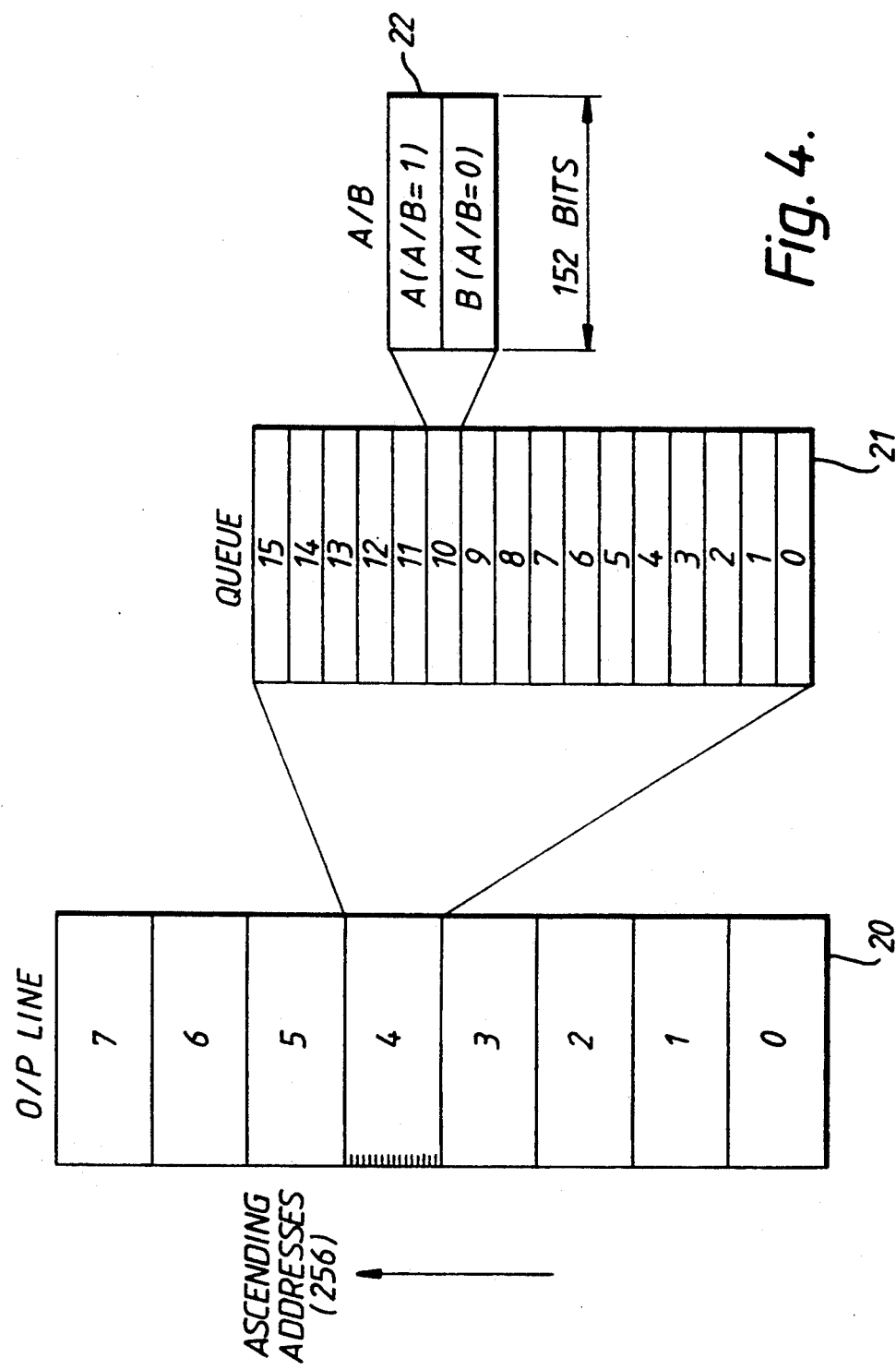
FIG. 4 shows a memory map.

Within the half cell period (152 bits long) there is 950 ns to write the eight incoming lines (A or B register data) to the RAM and also read onto the outgoing eight lines their respective data. FIG. 4 shows the 256 word by 152 bit memory map. An ascending address of 256 is shown represented by column 20. Each address is represented by a queue 21 comprising sixteen positions. Each position represents 2×152 bits representing the A and B section of the serial to parallel converter A, B as shown by box 22.

The FIFO queues are implemented in the memory with a read pointer and write pointer. Consider a sixteen location queue as shown by box 21 where data is taken from the head of the queue (at the read pointer address) and data is added to the tail of the queue (at the write pointer address). The read and write addresses can take the value 0 to 15 and on overflow they wrap around.

When data is written to the queue it is written to the address given by the write address pointer. The write address pointer is incremented and this address is compared against the read address, and if equal, the queue is now full. Under the queue full condition a FULL flag is set. An attempt to write to a full queue is aborted and the packet is lost. A read operation to the queue resets the queue FULL flag. Under normal working conditions the load on the system is adjusted so that the probability of meeting a queue full condition is very small.

When data is to be read from the queue, data is removed from the read address pointer. The read address pointer is incremented and this address is compared against the write address, and if equal, the queue is now empty. Under the queue empty condition an EMPTY flag is set. An attempted read of an empty queue is indicated in the D and B/F bit positions in the outgoing ATD cell. A write operation to the queue resets the queue EMPTY flag.

The above sequence of actions turn a sixteen element RAM into a first-in and first-out sixteen packet queue. The queue processor on the ATD device carries out the actions necessary for eight queues each having sixteen elements. The arrangement may be operated in one of two modes. In the 1st mode a 3 bit address is accepted by the queue processor 4 from the input address register 10 and one of the eight outputs may be addressed. In the 2nd mode a 4 bit address is accepted by the queue processor 4. If the input is from $LI_0$ to $LI_3$ then the first 2 bits of the address are used to address the outputs $LO_0$ to $LO_3$. If the input is from $LI_4$ to $LI_7$ then the last 2 bits of the address are used to address the outputs $LO_4$ to $LO_7$. In this 2nd mode the device may be used to provide two separate 4×4 switches with separate 2 bit routing digits for each.

Figure 5:
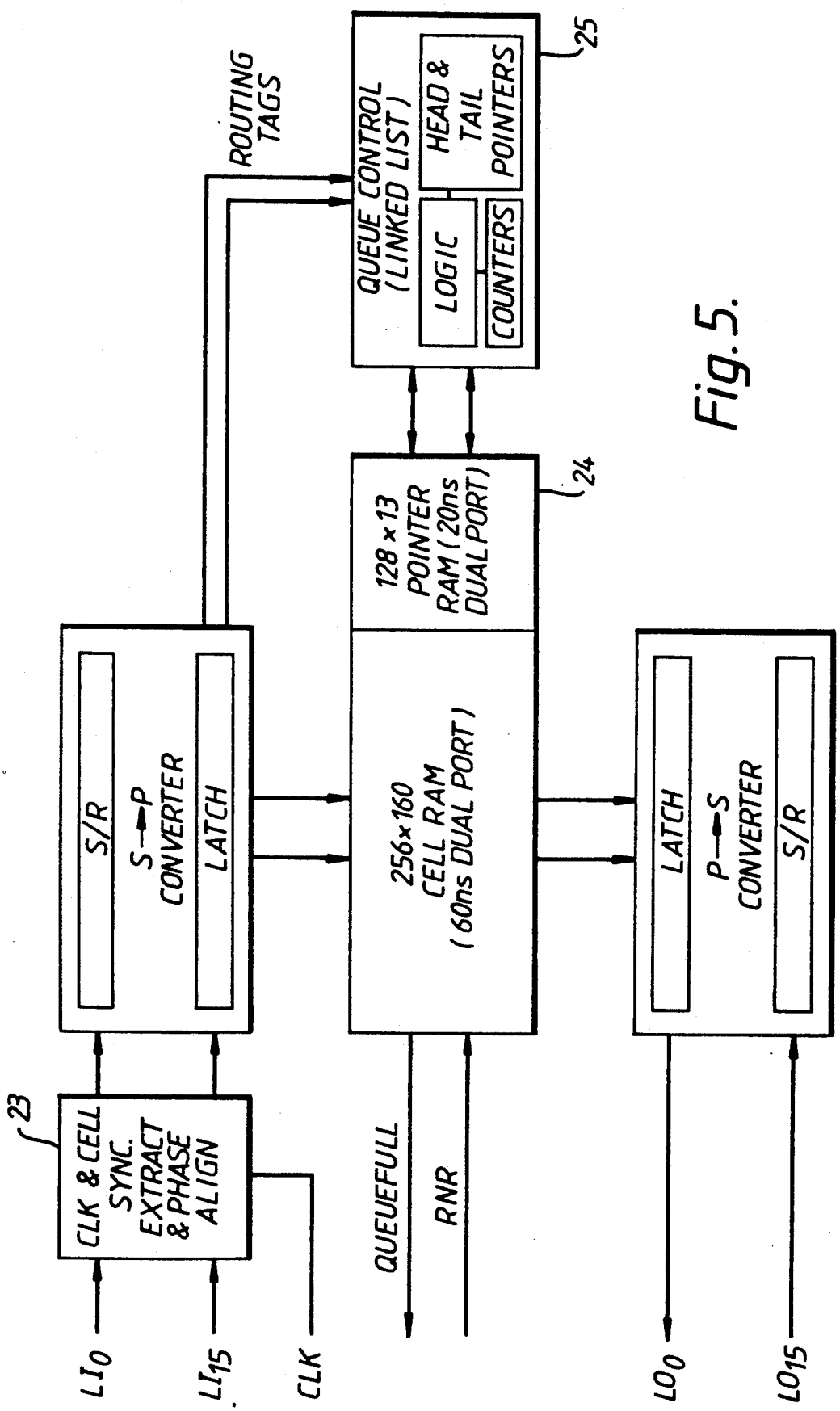
FIG. 5 shows a 16 by 16 shared queue asynchronous time division multiplex switch, and, FIG. 6 shows a typical switch structure using switching arrangements according to the present invention.

The above description has been of one embodiment of the invention and it will readily be seen by those skilled in the art that alternative embodiments may be envisaged. The inputs may contain both clock and data information which will be extracted, bit and slot-aligned on chip. Such a circuit is shown in FIG. 5 at box 23. It is also possible to reduce further the RAM size by sharing the RAM between the output queues in a linked list architecture, as shown in FIG. 5. To achieve this an extra pointer 24 is added to each RAM location that is made to point to the next location containing a cell in the same output queue. In order to avoid doubling the number of accesses to the RAM, which may not be possible due to time limitation, the extra pointer may be held in a separate RAM.

In this implementation the address value written into the write pointer is drawn from the head of the linked list of free memory locations, the queue FULL flag will only be set if this list is empty, i.e. there are no free locations anywhere in the memory. The queue FULL flag will be reset when a packet is read from any of the output queues.

When a packet is read from an output queue the link pointer associated with that memory element is read into the read pointer, indicating the address of the next packet in the same queue. At the same time the address of the now empty element just read from is added to the tail of the linked list of free memory locations.

As an error in the pointer value would cause major problems within the arrangement, extra bits would be added in order to perform error checking and correcting. Another check could be carried out by including counters that contain the number of packets in each queue, and the number of free locations, and then logic can then confirm that the total of all these counters is correct, otherwise the data must be lost and the RAMS re-initialised. Such logic, and counters together will head and tail pointers are shown at box 25.

The provision of twice as many inputs, as shown in FIG. 5, will double the input bandwidth to the queues. The use of two RAMs, one to hold the first half packet (A Field), the other to hold the second half packet (B Field) can be employed to reduce the access time required by the data RAM. Whilst the A field is being written to the A-RAM from all 16 inputs, the B field from the head of all 16 output queues will be read from the B-RAM. Similarly, in the next half packet period, the B fields are written to the B-RAM whilst the A fields are read from the A-RAM. Alternatively, and if memory access time is not a limitation, the above technique may be used to halve the length of the input serial-to-parallel converters and the output parallel-to-serial converters; in this case a packet would be held in a memory element comprising two half length words in each of the two RAMs.

Figure 6:
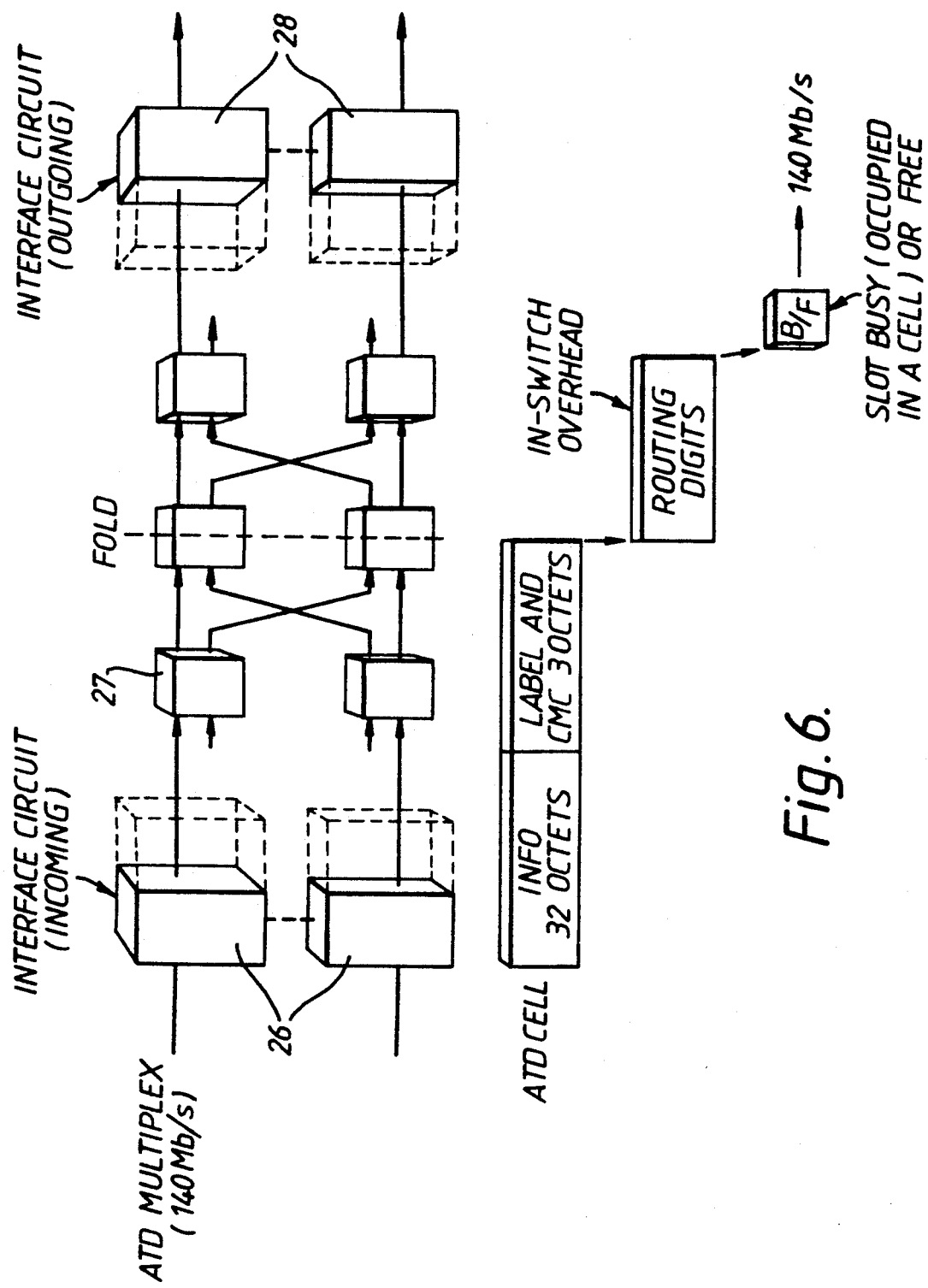

The switch structure shown in FIG. 6 is of one example, and it will be appreciated that many alternative structures are possible using the switching arrangement described.

The structure receives the 140 Mb/s multiplex on a number of incoming interface circuits 26, the function of which is to translate the label and add routing digits. The information is routed through a switching core comprising a plurality of switching arrangements, 27, to one of a number of outgoing interface circuits 28, which delete the routing digits before information is placed on an outgoing line.

FIG. 6 also shows a typical ATD cell, comprising 32 octets of information, and 3 octets used for the label and cyclic redundant check codes. These 3 octets identifies the virtual circuit.

The routing digits are part of the in-switch overhead, and the B/F bit is used to identify whether the slot is occupied by a cell or is free.

We claim:

1. An asynchronous time division multiplex switching arrangement comprising a serial to parallel converter arranged to receive input packets of data which include routing information, in serial form, and convert the packets of data to parallel form; a random access memory, a first-in-first-out (FIFO) output queuing means for each output wherein each packet of data in parallel form is entered at an addressed location into the random access memory, the address is entered at the tail of the respective FIFO output queue, and the address at the head of the FIFO output queue is accessed; and a parallel to serial converter for reading the packet of data from the random access memory at the address from the head of the FIFO output queue and serially delivering the packet of data to a required output.

2. An arrangement as claimed in claim 1, wherein means is provided to split each packet of data into 'k' segments, where 'k' is an even number and where means is provided to read successive odd and even segments into a respective half of the serial to parallel converter.

3. An arrangement as claimed in claim 2, wherein means is provided to read the successive odd and even segments from the random access memory into a respective half of the parallel to serial converter.

4. An arrangement as claimed in claim 3, wherein the random access memory is split into two halves, each of which is arranged to be accessed, independently, and used to store the respective odd and even segments of each packet.

5. An arrangement as claimed in claim 3, wherein the random access memory is split into 'k' parts, each of which is arranged to be accessed independently, and used to store the respective 'k' segments of each packet.

6. An arrangement as claimed in claim 1, wherein the respective FIFO output queue resides in the Random Access Memory and dynamically shares the capacity of the memory.

7. A method of operating an asynchronous time division multiplex switching arrangement comprising the steps of receiving input packets of data, by a serial to parallel converter, including routing information, in serial form; converting the packets of data to parallel form selecting data from the serial to parallel converter by a walking one sequencer; entering each packet of data in parallel form into an addressed location of a random access memory; drawing the address from the head of a first-in first-out queue of addresses of free locations in the memory where one or more separate FIFO output queuing means each associated with an output are provided to list in order of arrival the address location of input packets directed to said output, accessing the address when an address comes to the head of the queue; reading the packet of data from the random access memory into a parallel to serial converter; converting the packet of data to serial form; and serially delivering the packet of data to a required output.

8. An arrangement as claimed in claim 2, wherein the serial to parallel converter is controlled by a walking one sequencer unit.

* * * * *